United States Patent [19]

Eisfeldt

[11] 4,312,891

[45] Jan. 26, 1982

[54] SHELF STABLE DESSERT PRODUCT AND METHOD FOR MANUFACTURE THEREOF

[75] Inventor: Herbert R. Eisfeldt, Schiller Park, Ill.

[73] Assignee: Kraft, Inc., Glenview, Ill.

[21] Appl. No.: 125,114

[22] Filed: Feb. 27, 1980

Related U.S. Application Data

[63] Continuation-in-part of Ser. No. 939,247, Sep. 5, 1978, abandoned.

[51] Int. Cl.$^3$ .......................... A23C 19/09; A23L 1/04
[52] U.S. Cl. ...................................... 426/573; 426/582; 426/578; 426/564; 426/576
[58] Field of Search ............... 426/582, 564, 573, 576, 426/578

[56] References Cited

U.S. PATENT DOCUMENTS

| | | | |
|---|---|---|---|
| 2,714,069 | 7/1955 | Stuart et al. | 426/564 |
| 3,455,698 | 7/1969 | Vakaleris | 426/582 |
| 3,666,493 | 5/1972 | Bluemke | 426/564 |
| 3,726,690 | 4/1973 | Schuppner | 426/573 |
| 4,254,156 | 3/1981 | De Socio | 426/576 |

*Primary Examiner*—Jeanette M. Hunter
*Attorney, Agent, or Firm*—Fitch, Even, Tabin, Flannery & Welsh

[57] ABSTRACT

A shelf stable fluid dessert product which has a reversible gel structure at refrigerator temperatures. The dessert product is made by a method wherein a homogeneous, aqueous mixture of a gel-forming gum, starch, sweetener agent, and a proteinaceous source is provided. The fat content of the mixture is adjusted. The mixture is homogenized after the addition of any fat source other than cream cheese or cream. The mixture is heated to a temperature and for a time sufficient to pasteurize the mixture. The pH of the mixture is adjusted to below about 4.6 and the mixture is cooled to ambient temperature whereby a thixotropic dessert product is provided which is pourable at ambient temperatures and is gelled at refrigerator temperatures. The product is particularly adapted to reset at refrigeration temperature after being subjected to substantial shear, such as by aeration treatment.

15 Claims, No Drawings

SHELF STABLE DESSERT PRODUCT AND METHOD FOR MANUFACTURE THEREOF

This application is a continuation-in-part of copending application Ser. No. 939,247 filed Sept. 5, 1978 now abandoned.

The present invention relates generally to a shelf stable fluid dessert product which has a reversible gel structure at refrigeration temperatures. More particularly, the present invention relates to a dessert product for preparing a cheese cake type dessert wherein the dessert product is a thixotropic fluid mixture which is pourable at ambient temperature and which can be gelled at refrigeration temperature.

Cheese cake is a dessert item which is conventionally prepared using a soft, uncured cheese, such as cream cheese, baker's cheese or cottage cheese as the basis for a filling. The cheese is usually combined with other cake ingredients such as flour, butter or vegetable shortening, eggs, sugar and vanilla or other flavorings and is filled into a shell. It may be desirable to aerate the filling by mechanical whipping to provide a lighter texture and consistency to the finished dessert product. The filled shell is then baked to provide the final cheese cake product. Cheese cake desserts which do not require baking are also known. These usually rely upon a combination of gelatin and whipped egg whites or whipped cream to provide a rigid structure at refrigeration temperatures. Such non-bake cheese cakes are not reversible to provide a pourable mixture at room temperature and these cheese cakes are not shelf stable at ambient temperature.

Various dry mixes have been proposed which can be reconstituted with water to provide a cheese cake type dessert. One such dry mix is disclosed in U.S. Pat. No. 3,455,698 to Vakaleris. The Vakaleris patent discloses a dry food mix which is reconstitutable as a cheese cake filling. The dry mix contains a major portion of an acid coagulable protein source, sugar, flour, cornstarch and an acidogen which is hydrolyzable in water to release an edible acid. After reconstitution with water, the acidogen reacts to release an acid and to coagulate the protein after a batter is prepared from the dry mix. The batter is then baked to provide a traditional type cheese cake product.

Inasmuch as the cheese which provides the base for the cheese cake filling is a perishable food item, the householder normally procures the cheese shortly before preparation of the cheese cake. The dry mixes, such as proposed in the Vakaleris patent, were designed in an effort to permit the householder to prepare cheese cake at any time and without advance preparation, except for the addition of household staples, such as eggs, milk, butter or margarine. Heretofore, no product has been offered to the householder which is immediately ready to be placed into a filling to provide a cheese cake type dessert and which can be stored at ambient temperatures until required for use.

The product of the present invention is a novel mixture of components required to provide a cheese cake which is fluid and pourable at ambient temperature but which sets to a gel at refrigeration temperature and is reversible between the gel form and the pourable form. The dessert product of the present invention is thixotropic and can be made fluid even at refrigeration temperatures by stirring or agitation. The dessert product has significant ability to rest at refrigeration temperature after being subjected to substantial mechanical shear, such as by being aerated by mechanical whipping. This latter characteristic facilitates the preparation of set, aerated dessert products having a light texture in a relatively short period of time.

In this connection, setting of the dessert product in the form of the prepared dessert item, within a reasonably limited period of time, such as about two hours at refrigeration temperature is desirable to provide a convenience food item to the consumer.

Accordingly, it is a principal object of present invention to provide a shelf stable dessert product which is pourable at ambient temperature and which sets to a gel at refrigeration temperature, even after being aerated.

It is another object of the present invention to provide a shelf stable dessert product for use as a cheese cake filling which is complete and can be placed directly into a mold or shell and which can be refrigerated to provide a gel structure after being subjected to mechanical shear.

It is a further object of the present invention to provide a thixotropic dessert product utilizable as a cheese cake filling which has a reversible gel structure at refrigeration temperatures which sets in a limited period of time.

It is a still further object of the present invention to provide a dessert product which is ready to use as a cheese cake filling and which is shelf stable at ambient temperatures for extended periods of time. These and other objects of the invention will become apparent from consideration of the following detailed description.

Generally, in accordance with the present invention, a shelf stable dessert product which has a reversible gel structure at refrigeration temperatures is prepared by a method including the following steps:

A homogeneous, aqueous mixture of a particular gel-forming gum, a sweetening agent, starch and a proteinaceous source is prepared. The proteinaceous source is selected from the group consisting of cream cheese, Neufchatel cheese, cottage cheese, casein, an edible caseinate salt and an edible soy proteinate salt. The fat content of the aqueous mixture is adjusted to within the range of from about 15 to about 25 percent fat by selection of proteinaceous source or by the addition of a suitable fat source. The mixture is then heated to a temperature and for a time sufficient to pasteurize the mixture. The pH of the mixture is adjusted to below about 4.6 and the mixture is cooled to ambient temperature. At ambient temperature, a thixotropic dessert product is provided which is shelf stable, which is pourable at ambient temperature and which is gelled at refrigeration temperature. By "refrigeration temperatures" is meant the temperature usually encountered in a household refrigerator of from about 2° C. to about 10° C.

While not wishing to be bound by any theory, it is believed that the interaction of the gelatin component, the starch, the sweetening agent and the proteinaceous source at the particular levels of use for each component during the heating step of the present invention provides a gel matrix which is reversible and which is thixotropic. A synergistic effect occurs which is believed to be the result of the choice of the particular ingredients of the mixture and the level of use of the ingredients in the finished product. The gel matrix at ambient temperature is semi-fluid but pours readily after slight agitation. The product may be aerated such as by being whipped to increase the whipped product volume with respect to the unwhipped product volume by incorporation of air, by at least 10% and preferably at least 20% (i.e., an "overrun" of at least 10 or preferably at least 20 percent). The final form of the product when refrigerated has a soft pleasing mouth feel without the characteristic rubbery texture associated with gel-forming gums, such as gelatin. The gelatin gel-forming component is an important constituent of the dessert product, and serves to improve the texture and eating qualities of the dessert product, as well as contributing to the reversible gel-matrix of the product. The gel-forming gums are used in the formulation of the present invention in an amount ranging from about 0.4 percent to about 0.7 percent, preferably at a level ranging from about 0.45 percent to about 0.55 percent. As used herein, all percentages are by weight and all temperatures are given in degrees Centigrade, unless specifically indicated otherwise.

Particularly preferred is pig or calf gelatin with a Bloom strength in the range of from about 150 to about 250. It should be recognized that, while other gel forming materials have the ability to form hard gels, which are defined as a rigid structure that does not flow, such gums do not provide the combination of properties to the dessert product of the present invention. Some gums, such as tragacanth, form thick heavy pastes at high concentrations that are sometimes called gels, but are not true gels. Other gums, such as furcellaran, form gels but are degraded when heated under acidic conditions as are used in the process of the present invention. Other gums, such as agar, form gels but have extreme hysteris lag which is the ability to gel at temperatures much lower than the gel-melting temperature. Gums such as xanthan gum and locust beam (carob) gum may provide dessert products having properties similar to gelatin-containing products and having some reversible gel character, but do not provide the desirable mouth feel characteristics of the gelatin containing product, and do not provide a rapid resetting at refrigeration temperatures after being subjected to a high degree of mechanical shear such as by whipping of air into the product at ambient or refrigeration temperatures. Minor amounts of such other gums may be used in combination with the gelatin component to provide slightly altered properties but such use in accordance with the present invention should be restricted to less than about 25 weight percent of the total gelatin present.

The starch used in the dessert product of the invention can be any food starch in its native or modified form. Native starches are produced by extraction from the seeds of plants such as corn, wheat, sorghum or rice; the tubers, or roots of plants, like cassaba (tapioca), potato or arrowroot; and the pith of the sago palm. Particularly preferred is cornstarch because of the commercial availability of cornstarch. The starch can be either pre-gelatinized or non-gelatinized. If the starch is non-gelatinized, the heating step of the invention must be sufficient to effect gelatinization during the preparation of the dessert product. The use of pre-gelatinized starch is preferred to insure gelatinization of starch in the dessert product. A particularly preferred starch for use in the present invention is pregelatinized waxy maize starch.

It is known that food starch has gelling properties however, it should be understood that the starch is used in the dessert product of the present invention primarily as a stabilizer for the fatty emulsion which is present in the dessert product and not for contribution to the gel structure except as it interacts with the gelatin component. It is well known that gelled foods prepared from starch have syneresis problems during storage and there is no syneresis problem with the dessert product of the invention. The starch is present in the dessert product at a level of from about 0.4 to about 2 percent, preferably from about 0.5 to about 1 percent. This level of use is much lower than normally used for starch paste emulsion products, such as salad dressing.

The proteinaceous source is selected from the group consisting of cream cheese, Neufchatel cheese, cottage cheese, an edible caseinate salt, casein and an edible soy proteinate salt. The proteinaceous source is present at a level sufficient to provide from about 2 to about 7 percent protein in the dessert product. The preferred protein source is cream cheese and Neufchatel cheese.

The dessert product of the invention desirably has a fat content of from about 15 to about 25 percent. It is preferred to use cream cheese as the proteinaceous source in the dessert product of the present invention. Cream cheese contains from about 30 to about 40 percent butterfat and when used at the desired level for the proteinaceous source, the fat of the cream cheese supplies all or most of the fat necessary for the dessert product. When any of the other proteinaceous sources are used, it is necessary to provide an additional source of fat. The fat is preferably selected from butterfat, cream, butter oil, coconut oil and partially hydrogenated vegetable oils having an IV of from about 75 to about 100.

What a fat source other than cream creese or Neufchatel cheese is used in the dessert product of the present invention, it is desirable to homogenize an aqueous mixture containing the protein source and the fat source prior to the final heating step to provide a fatty emulsion. Either single stage or double stage homogenization can be used at pressures of from about 250 psig to about 5000 psig.

It is desirable to limit the level of lactose in the dessert product to less than about 3 percent so as to prevent the formation of lactose crystals or a Maillard reaction during storage of the dessert product. Accordingly, the proteinaceous source is selected from the indicated group so as to provide less than about 3 percent lactose in the final dessert product.

It is also desirable to have at least some edible caseinate salt in the dessert product. In a preferred embodiment of the present invention, sodium caseinate is present in the dessert product at a level of from about 0.5 to about 3 percent without regard to any other proteinaceous source present in the dessert product. The presence of sodium caseinate aids in water binding and in the cold set properties of the dessert product.

The sweetening agent is preferably a natural sweetening agent, such as sucrose or dextrose. Natural sweetening agents are used at a level of from about 10 to about 25 percent. Artificial sweeteners, such as saccharin, can be used to replace a maximum of about half of the natural sweetening agents.

Natural or synthetic flavoring agents may be used to impart a final desired flavor to the dessert product. In general, flavoring agents are used at a level of less than about one percent and any suitable flavor can be used in the dessert product. Moreover, it may be desirable to include effective amounts of edible whipping emulsifiers such as those conventionally known and utilized as whipping agents, to enhance or facilitate the incorporation of air into the product when it is desired to provide an aerated dessert product. However, the addition of such materials is generally entirely unnecessary to achieve whipped products of desirable overrun. In this connection, preferred compositions may be readily whipped at ambient temperature to provide about a 20 percent overrun (i.e., ratio of volume of whipped material to starting composition of 1.2), and to provide an overrun in the range of from about 30 to about 35 percent at refrigeration temperature. The whipped compositions readily reset at refrigeration temperatures (without reheating) within 2 hours or less.

A homogeneous, aqueous mixture of the ingredients is formed by any suitable method. In this connection, it is generally desirable to heat the water used in the preparation of the dessert product and to add the other ingredients to the heated water. The dry ingredients are preferably added by suitable equipment to prevent lumping of the dry ingredients. One suitable method for blending the dry ingredients with the water is a tank containing a continuous piping loop through which the water is recirculated by means of a centrifugal pump. The dry ingredients are gradually fed into the loop prior to passage of the water through the pump. If a fat source is used in the preparation of the dessert product, the homogeneous, aqueous mixture is homogenized prior to the final heating step.

After a homogeneous, aqueous mixture of the ingredients is formed, the mixture is heated to a temperature sufficient to pasteurize the mixture. Suitable heating conditions are to a temperature of from about 72° to about 90° C. for a time of from about 15 minutes to about 5 minutes, the longer time corresponding to the lower temperature and equivalent intermediate times being used at intermediate temperatures. Ultra high temperature short time (UHTST) conditions of about 100°–110° C. for substantially no hold time can also be used. If a non-gelatinized starch is used, the final heating conditions are selected so as to be above the gelatinization temperature for the starch.

After the pasteurization heating step, the pH of the mixture is adjusted to below about 4.6 by the addition of a suitable edible acid. Suitable edible acids include but are not limited to citric acid, lactic acid, malic acid, acetic acid, phosphoric acid, hydrochloric acid, glucona delta lactone, fumaric acid and mixtures thereof.

The dessert product of the invention is then filled into containers and sealed. The dessert product should be filled and sealed while at a temperature of 72° C. or above to insure adequate shelf life.

The dessert product of the present invention generally has the following level of components at the indicated range of use.

| Component | Range |
| --- | --- |
| Protein | 2–7 |
| Fat | 15–25 |
| Sugar (other than lactose) | 10–25 |
| Lactose | >3 |
| Water (qs for Final Product) | 48–52 |
| Starch | .4–2 |
| Gelatin | .4–.7 |
| Flavoring | >1.0 |
| pH | 4.0–4.6 |

The following examples further illustrate various features of the present invention but are not intended to in any way limit the scope of the invention which is defined in the appended claims.

EXAMPLE 1

A cheese cake filling in accordance with the present invention is made using cream cheese as the protein and fat source. The filling has the following ingredients in the given amounts:

| Ingredients | Weight Percent |
| --- | --- |
| Cream Cheese | 53.74 |
| Granulated sugar (sucrose) | 22.45 |
| Water | 20.21 |
| Fresh curd sodium caseinate | 1.66 |
| Vanilla extract | 0.56 |
| Pregelatinized waxy maize starch | 0.56 |
| Calfskin gelatin, 220 bloom | 0.55 |
| Lactic acid, 85% | 0.23 |
| Lemon emulsion | 0.04 |
|  | 100.00 |

A jacketed conical tank with controlled temperature water circulating through the jacket and having a motordriven stainless steel propeller-type impeller is used for heating and blending the ingredients. A recirculating loop with centrifugal pump and hopper feeder was connected to the tank and the contents of the conical tank are circulated through the loop, enabling dry ingredients to be added without undesirable lump formation. Water is heated to 54° C., and gelatin, sodium caseinate, and starch are added. The cream cheese is added, the sugar is added and the temperature raised to 82° C. Lactic acid and flavorings are added, and the product is held at 82° C. for ten minutes with agitation. The pH of the product is 4.38, and is commercially sterile as determined by standard bacteriological testing. Product at 82° C. is packaged in a variety of airtight containers including glass jars, vinyl chloride tubes, polypropylene cups, aluminum cups, tinned cans, and polyethylene/aluminum foil laminate flex packs.

These various packages may be stored at 7° C., ambient room temperatures (24° C.), 30° C., and 37° C. in the absence of light and examined periodically for quality changes. From a bacteriological standpoint, the cheese cake filling was highly acceptable as total counts were reduced during the storage period. Refrigerated filling (7° C.) is unchanged in flavor characteristics during the eight-month test. At ambient room temperature, slight yellowing of the product and development of a barely detectable carmelized taste occurred in eight months—still highly acceptable. At 30° C., browning and carmelized flavor development made the product unacceptable in four to five months. At 37° C., these same factors resulted in unacceptable products in less than two months. During the storage period, selected samples were used to prepare cold set cheese cakes of good quality.

The product has been packaged in a variety of air tight containers including glass jars, vinyl chloride tubes, polypropylene cups, aluminum cups and polyethylene/aluminum foil laminate flex packs. After sealing, the container is cooled as rapidly as possible to a temperature of about 20° C. and placed in storage or tested by placing in a graham cracker crumb crust shell to evaluate the taste and consistency. Further, samples are tested for consistency using a Brookfield viscometer Model RVF.

An acceptable viscosity using the F spindle at 0.5 rpm would be in the range of 5-9 at room temperature or 20 to 36 at 7° C. The most desirable viscosity for this product is a Brookfield reading of 32-34 units.

The product may be subjected to substantial shear, and still exhibits rapid resetting characteristics at refrigeration temperature without heating of the product to elevated temperature. In this connection, air may be whipped into the product at ambient or refrigeration temperature as by a home mixer, and the whipped composition incorporated into the dessert product, such as a graham cracker crust. The whipped composition will rapidly (e.g., in 2 hours or less) reset at refrigeration temperature to provide an aerated cheese cake dessert.

EXAMPLE 2

A cheese cake filling in accordance with the invention was made in accordance with the procedure of Example 1 using the following formulation:

| Ingredients | Weight Percent |
| --- | --- |
| Cottage cheese curd (17.6% solids) | 35.10 |
| Sugar (sucrose) | 22.34 |
| Water | 22.67 |
| Butter oil | 18.03 |
| Pregelatinized waxy maize starch | 0.60 |
| Vanilla extract | 0.56 |
| Pigskin gelatin | 0.51 |
| Citric Acid | 0.15 |
| Lemon emulsion | 0.04 |
| | 100.00 |

The cottage cheese curd was dispersed in water and warmed to 54° C., the butter oil was added and the mixture was homogenized using 2000 psig on the first stage and 500 psig second stage. Gelatin and starch were added to the viscous liquid and the mixture was heated to 68° C. The sugar was added and the blend heated to 82° C. for ten minutes. After cooling, the pH was 4.25. The filling was added to a graham cracker crumb crust shell to prepare cheese cake having the consistency and taste characteristics of cold set cheese cake after one hour at refrigeration temperatures of 1°-10° C. A second batch was made wherein one-third of the citric acid was replaced by an equal weight of malic acid to provide an equivalent pH and less "acid bite" when consumed.

EXAMPLE 3

A formulation similar to that given in Example 1 was used to prepare a cheese cake filling using Neufchatel cheese in place of cream cheese.

| Ingredients | Weight Percent |
| --- | --- |
| Neufchatel cheese | 53.74 |
| Sugar (sucrose) | 22.45 |
| Water | 21.47 |
| Vanilla extract | 0.56 |
| Pregelatinized waxy maize starch | 1.00 |
| Calfskin gelatin, 220 bloom | 0.50 |
| Lactic acid, 85% | 0.24 |
| Lemon emulsion | 0.04 |
| | 100.00 |

The processing of Example 1 was followed giving a filling having a pH=4.40 and providing a good quality cheese cake when set at refrigeration temperatures of 1°-10° C. for about one hour.

EXAMPLE 4

This example illustrates the use of sodium caseinate and vegetable fat to prepare a shelf-stable cheese cake filling.

| Ingredients | Weight Percent |
| --- | --- |
| Water | 50.13 |
| Granulated sugar (sucrose) | 22.41 |
| Coconut oil, 76° F. | 17.50 |
| Fresh curd sodium caseinate | 6.87 |
| Pregelatinized waxy maize starch | 1.00 |
| Imitation vanilla flavor | 0.56 |
| Dry lemon powder | 0.56 |
| Lactic acid, 88% | 0.52 |
| Pigskin gelatin, 250 bloom | 0.45 |
| | 100.00 |

Sodium caseinate was added to the water which was heated to 54° C. and the coconut oil was blended in. The mixture was homogenized in a two-stage homogenizer at 2000 psig first stage, 500 psig second stage. The emulsion was heated to 66° C. and gelatin, starch, and granulated sugar were added. The blend was heated to 82° C. and the dry flavorings were added. Lactic acid was added to adjust the pH to 4.27 and the filling was held at 82° C. for ten minutes. Standard bacteriological testing indicated the bacterial profile was desirably low. The filling had acceptable shelf life and provided cold set cheese cake consistency on refrigeration.

EXAMPLE 5

This example illustrates the use of isolated soy protein and vegetable fat to prepare a shelf-stable cheese cake filling. The procedure of Example 1 was used:

| Ingredients | Weight Percent |
| --- | --- |
| Water | 50.13 |
| Granulated sugar | 22.75 |
| Partially hydrogenated soybean oil, 82 I.V. | 19.00 |
| Sodium soy proteinate | 5.50 |
| Pregelatinized waxy maize starch | 0.75 |
| Imitation vanilla powder | 0.56 |
| Dry lemon powder | 0.56 |
| Pigskin gelatin, 250 bloom | 0.49 |
| Phosphoric acid, 85% | 0.26 |
| | 100.00 |

The soy proteinate was dispersed in 49° C. water and the soybean oil was added. The mix was homogenized two-stage at 2500 psig first stage and 500 psig second stage. The gelatin and starch were added, the temperature adjusted to 66° C. and the sugar added. The temperature was adjusted to 82° C. and the dry flavorings added. The phosphoric acid was added to a part of the water to reduce the concentration to 20 percent and added to the filling. The product was held at 82° C. for ten minutes and filled in glass jars which were tightly capped. The pH was 4.45 and had a suitable low bacteriological profile. A second batch was made using 0.01 percent ascorbic acid or sodium ascorbate to provide a flavor note similar to that provided by dairy protein and lactose. The filling sets on refrigeration to give a cheese cake consistency and shelf life is satisfactory.

EXAMPLE 6

Sucrose was replaced with corn syrup solids as given in the following formulation:

| Ingredients | Weight Percent |
| --- | --- |
| Cream cheese | 53.74 |
| 63 D.E. corn syrup (84% solids) | 26.72 |
| Water | 15.54 |
| Fresh curd sodium caseinate | 1.66 |
| Vanilla extract | 0.56 |
| Pregelinized waxy maize starch | 0.56 |
| Calfskin gelatin, 220 bloom | 0.55 |
| Lactic acid, 85% | 0.23 |
| Lemon emulsion | 0.44 |
| | 100.00 |

This formulation was processed in the same equipment and in the manner as given in Example 1. The cheese cake filling was similar in consistency and taste to that provided in Example 1, but had a shorter shelf life due to more rapid browning at 30° C. and 37° C. than the formulation containing sucrose given in Example 1.

In like manner, 42 D.E. corn syrup (81% solids) was substituted for the sucrose in Example 1. The sweetness of the filling was slightly reduced compared to that provided in Example 1, the added flavors were slightly masked, and browing proceeded more rapidly at 30° C. and 37° C.

In a similar manner, lactose which had been hydrolyzed to glucose and galactose to the extent of about 95% and which had been freeze-dried to remove water, was used as a replacement for sucrose in Example 1. Processing and properties of the fillings were substantially as given in Example 1.

Accordingly, in view of the present disclosure, it will be appreciated that in accordance with the present invention, an improved shelf-stable dessert product is provided which has reversible gel structure at refrigeration temperatures, even under high shear conditions such as produced by mechanical incorporation of air into the product by whipping, and which has particular utility as a convenience food item.

While the invention has been specifically described by reference to various specific embodiments, it will be recognized that various modifications, adaptations and variations, may be made without departing from the spirit and scope of the present invention as defined by the following claims.

Various of the features of the present invention are set forth in the following claims.

What is claimed is:

1. A method for manufacture of a shelf stable dessert product which has a reversible gel structure at refrigeration temperatures comprising the steps of
providing a homogeneous, aqueous dessert mixture of gelatin, starch, a sweetening agent, and a proteinaceous source selected from the group consisting of cream cheese, neufchatel cheese, cottage cheese, casein, an edible caseinate salt and an edible soy proteinate salt,
adjusting the fat content of said mixture to provide said mixture with a fat content in the range of from about 15 to about 25 percent by weight, based on the weight of said mixture, said gelatin being present in said dessert mixture at a level of from about 0.4 to about 0.7 by weight, said starch being present in said dessert mixture at a level of from about 0.4 to about 2 percent by weight, said sweetening agent being present in said dessert mixture at a level of from about 10 to about 25 percent by weight, and said proteinaceous source being present at a level to provide a protein content in said dessert mixture at a level of from about 2 to about 7 percent by weight, based on the weight of said dessert mixture,
homogenizing said mixture after the addition of any fat source other than cream cheese or cream,
heating said mixture to a temperature and for a time sufficient to pasteurize said mixture,
adjusting the pH of said mixture to a pH value below about 4.6, and
cooling said mixture to ambient temperature to provide a substantially syneresis-free, ambient temperature shelf stable thixotropic dessert product having a reversible gel structure at refrigeration temperature such that said dessert product is pourable at ambient temperature and is gelled at refrigeration temperature.

2. A method in accordance with claim 1 wherein the pH of said dessert product is within the range of from about 4.0 to about 4.6.

3. A method in accordance with claim 1 wherein said starch is present in said aqueous mixture at a level of from about 0.5 to about 1 percent by weight of said mixture.

4. A method in accordance with claim 1 wherein said thixotropic dessert product has a Brookfield viscosity at 0.5 rpm in the range of from about 5 to about 9 at room temperature, and in the range of from about 32 to about 34 at a temperature of 7° C.

5. A method in accordance with claim 1 further comprising the steps of aerating said dessert product under mechanical shear conditions to provide an aerated dessert product having an overrun of at least 10 volume percent with respect to the unwhipped volume and refrigerating said aerated dessert product at refrigeration temperature to provide a reversibly gelled aerated dessert product.

6. A method in accordance with claim 1 wherein said gelatin is selected from the group consisting of pig gelatin and calf gelatin having a bloom strength in the range of from about 150 to about 250.

7. A thixotropic dessert product utilizable as a cheese cake filling which has a reversible gel structure at refrigeration temperatures, said dessert product having a pH of less than about 4.6 and being a homogeneous, aqueous mixture comprising from about 0.4 percent to about 0.7 percent by weight of gelatin, from about 10 to about 25 percent by weight of a sweetening agent, from about 0.4 to about 2 percent by weight of starch and a proteinaceous source being selected from the group consisting of cream cheese, neufchatel cheese, cottage cheese, casein, an edible caseinate salt and an edible soy proteinate salt, the fat content of said aqueous mixture being present in the range of from about 15 to about 25 percent by weight, and wherein said proteinaceous source is present in said aqueous mixture at a level sufficient to provide from about 2 to about 7 percent by weight of protein in said dessert product, said aqueous, thixotropic dessert product mixture being shelf stable and substantially syneresis-free, and having a reversible gel structure at refrigeration temperature such that said dessert product mixture is pourable at ambient temperature and is gelled at refrigeration temperature.

8. A dessert product in accordance with claim 7 wherein said gelatin is selected from the group consisting of pig gelatin and calf gelatin having a bloom strength in the range of from about 150 to about 250.

9. A dessert product in accordance with claim 7 wherein said starch is a food starch derived from a food product selected from the group consisting of corn, wheat, sorghum, rice, casaba, potato, arrowroot and sago palm.

10. A dessert product in accordance with claim 7 wherein said starch is cornstarch.

11. A dessert product in accordance with claim 7 wherein said cornstarch is pregelatinized waxy maize starch.

12. A dessert product in accordance with claim 7 wherein said proteinaceous source is selected so as to provide less than about 3 percent lactose in said dessert product.

13. A dessert product in accordance with claim 7 wherein sodium caseinate is present in said dessert product at a level of from about 0.5 to about 3 percent.

14. A dessert product in accordance with claim 7 wherein said aqueous mixture has an F spindle Brookfield viscosity at 0.5 rpm in the range of from about 5 to about 9 at room temperature, and in the range of from about 32 to about 34 at a temperature of 7° C.

15. A dessert product in accordance with claim 7 wherein said dessert product is an aerated, reversible gelled product having an overrun of at least about 10 volume percent.

* * * * *